April 4, 1961

G. IRWIN 2,977,865

FLASH CAMERA AND REFLECTOR

Filed Oct. 13, 1958

INVENTOR.
George Irwin
BY
Ooms, McDougall, Williams & Hersh
Attorneys

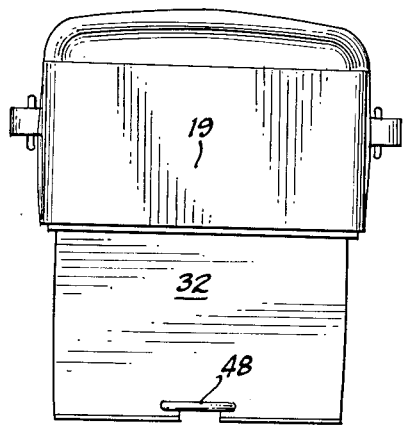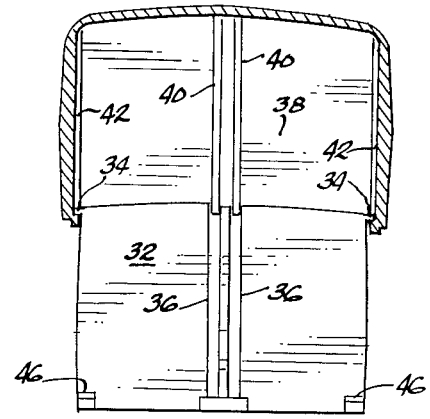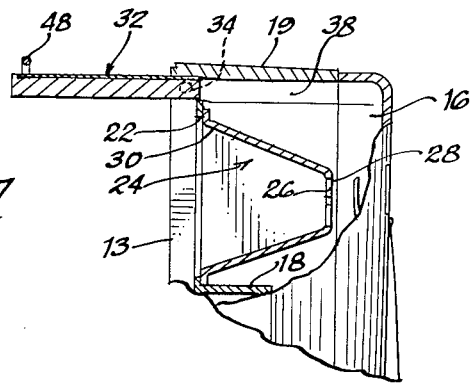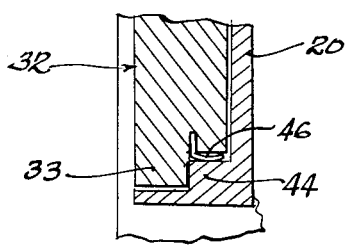

April 4, 1961

G. IRWIN 2,977,865

FLASH CAMERA AND REFLECTOR

Filed Oct. 13, 1958

INVENTOR.
George Irwin
BY
Ooms, McDougall, Williams & Hersh
Attorneys

United States Patent Office 2,977,865
Patented Apr. 4, 1961

2,977,865

FLASH CAMERA AND REFLECTOR

George Irwin, Chicago, Ill., assignor to Herbert George Company, Chicago, Ill., a corporation of Illinois Filed Oct. 13, 1958, Ser. No. 766,994

6 Claims. (Cl. 95—11)

This invention relates to a camera and, more particularly, to a camera wherein the flash attachments, including a reflector, are permanently and protectively mounted in recesses in the camera housing.

Flash equipment in the form of attachments has long been associated with cameras. This equipment generally includes a light reflector with means for mounting a flash bulb therein and a housing attached to the light reflector for holding a power source such as electric batteries. The entire unit could be plugged into a camera so that when the camera was actuated a circuit would close which would trigger the flash bulb in synchronization with the camera shutter.

There are certain objections to this arrangement. For one thing, because the flash equipment is separate from the camera, it can be lost or misplaced. In addition, it can be forgotten or left behind at inopportune times. To prevent this from happening, the flash equipment could always be left plugged into the camera, but this is objectionable because the camera with the flash equipment attached is awkward to handle due to the large and bulky reflector. This reflector is normally in an exposed position, and since it is formed from comparatively thin sheet metal, accidental blows and jars could deform it and reduce its reflecting power. Furthermore, continuous exposure of the reflector to the ambient air is harmful because it becomes tarnished.

What is needed, therefore, and comprises the principal object of this invention, is a camera with the flash equipment permanently mounted in recesses in the camera housing.

A further object of this invention is to provide a camera having flash equipment permanently mounted in recesses in a camera housing which is provided with means for protecting the reflector from accidental blows or from exposure to the ambient air when the flash equipment is not being used.

Yet another object of this invention is to provide a camera having flash equipment permanently mounted in recesses in the camera housing and a flash bulb reflector shaped so it is substantially parallel to a portion of the periphery of the camera housing.

Still another object of this invention is to provide a camera housing having flash equipment permanently mounted in recesses in the camera housing wherein the flash bulb reflector has the shape of the frustum of a quadrangular pyramid.

These and other objects of this invention will become more apparent when read in the light of the accompanying drawings and specification wherein:

Figure 5 is a plan view of the camera housing with the closure for the reflector in a horizontal position and showing the top surface of the housing and the closure;

Figure 6 is a view showing the inner surface of the top of the camera and the under surface of the closure;

Figure 7 is a sectional view taken on the line 7—7 of Figure 2 and looking in the direction indicated; and Figure 8 is a sectional view taken on the line 8—8 of Figure 1 and looking in the direction indicated.

Figure 1:
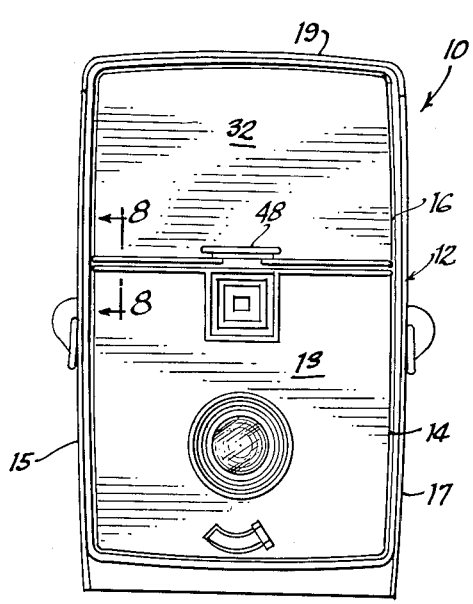
Figure 1 is a front elevational view of one modification of the improved camera in which the flash bulb reflector is protected from exposure to the ambient air and from accidental blows.

Referring now to Figure 1 of the drawings, a camera indicated generally by the reference numeral 10, comprises a camera housing 12 which is substantially rectangular in cross section. The housing is divided into two horizontally spaced sections 14 and 16 which are separated by a dividing wall 18, see Figure 7. The camera lens, shutter, and the film-moving mechanism are mounted in section 14, while the flash equipment including the batteries may be mounted in section 16.

Section 16 is provided with a front wall 20, and this wall has a rectangular opening 22 formed therein. A flash bulb reflector 24 having substantially the shape of a frustum of a quadrangular pyramid is permanently mounted in opening 22 by any conventional means (not shown), see Figure 7. This reflector is treated so its concave surface is strongly light reflecting, and it is provided with an opening 26 in its rear or smaller base 28 for receiving a flash bulb, see Figure 2.

Figure 2:
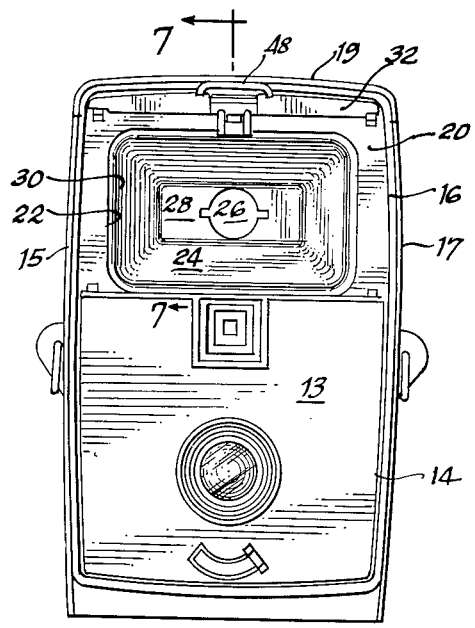
Figure 2 is a front elevational view of the improved camera similar to that of Figure 1, but showing the flash bulb reflector exposed and ready for use.

As seen in Figures 2 and 7, the periphery 30 of the larger base of the frustum is parallel to and inset from the front surface 13 of the housing. In addition, periphery 30 is parallel to and closely adjacent to the side surfaces 15 and 17 and the top 19 of the housing, so that the width of the housing is almost equal to the width of the reflector 24. This is why the shape of the reflector is important. With portions of the periphery of the camera housing and the reflector parallel and closely adjacent to each other, the camera can be reduced to a very compact size for ease in handling, yet the shape of this reflector does not adversely affect its reflecting power.

Figure 4:
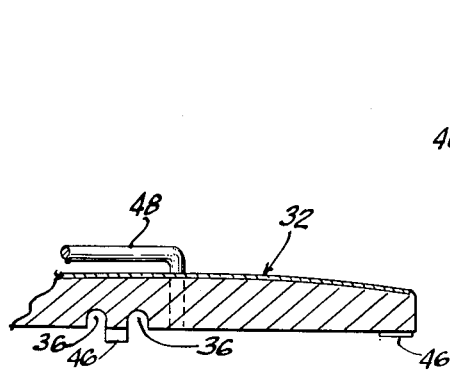
Figure 4 is a sectional view taken on the line 4—4 of Figure 3 and looking in the direction indicated.

A closure 32 is movably mounted in the housing. This closure is substantially rectangular in shape and may be formed from any suitable metal or plastic, sheet or plate material. As seen in Figure 6, the sides of the closure are provided with rigidly attached and oppositely extending pintles 34. In addition, as seen in Figure 4, spaced parallel guide grooves 36 are formed in the inner surface of the closure centrally between the sides and parallel thereto.

The housing 12 is provided with an additional opening 38 defined by the inner surface of the top 19 of the housing and the top edge of the front wall 20, see Figure 7. Tracks 40 composed of rods or bars, may be rigidly mounted in the opening 38 centrally between the sides for a guiding penetration of the guide grooves 36, as described below, see Figure 6. The opposite sides of the opening 38 are provided with pintle-receiving grooves 42 in which the pintles ride. With this arrangement, when the camera flash equipment is not being used, the closure 32 is in the position shown in Figure 1 and is pivotally suspended by the pintles 34. In addition, as seen in Figure 8, the stepped lower edge 33 of the closure 32 rests on the stepped shelf 44 formed in the front wall 20. The closure is retained in this closed position by means of the engagement of the conventional friction clips 46 on the lower edge of the closure with the stepped shelf 44. When the closure is in this closed or sealing position, it is apparent that the reflector 24 is substantially protected from exposure to the ambient air, so that the reflecting finish on the reflector will not be marred by corrosion or tarnish, or by scratches or dents caused by accidental blows.

Figure 3:
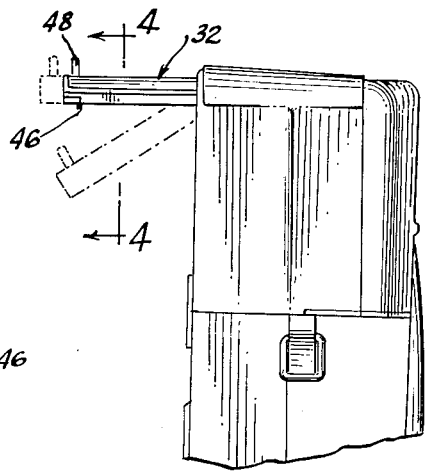
Figure 3 is a side elevational view of the upper portion of the housing of the camera showing how the closure for the reflector is operated.

When it is desired to use the flash equipment, the handle 48 of the closure is grasped and the closure is first pivoted to a horizontal position, as seen in Figures 3, 5 and 7. Then the closure 32 is moved horizontally and is forced into the opening 38 with the pintles 34 riding in the guide grooves 42 on the sides of the opening and with the grooves 36 on the inner surface of the closure riding on the guide tracks 40, see Figure 3. When the closure is entirely in the opening 38, as seen in Figure 2, it will be completely protected from accidental blows which could damage it. In addition, since the closure is never removed from the housing, there is no likelihood that it will ever become lost or forgotten.

Figure 9:
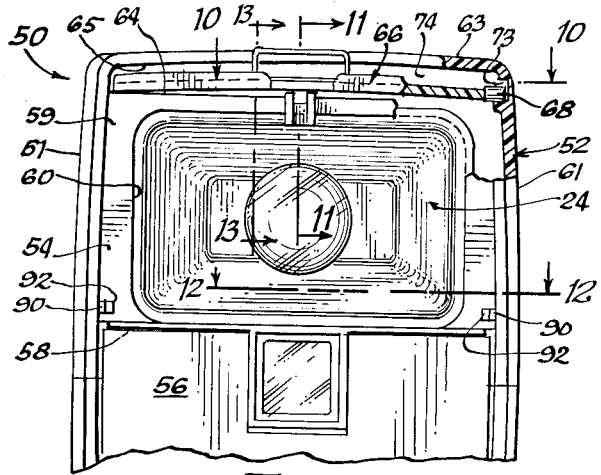
Figure 9 is a front elevational view of the upper portion of another modification of the improved camera.

The modification shown in Figures 9–14 differs from the modification shown in Figures 1–8 in the way the reflector closure is mounted on the camera housing. As seen in Figure 9, the modified camera indicated generally by the reference numeral 50 comprises a camera housing 52, which like the modification shown in Figure 1 is also substantially rectangular in cross section, and is formed from a somewhat resilient plastic material. The camera housing is divided into horizontally spaced sections 54 and 56 which are separated by a dividing wall 58, see Figures 9 and 13. The flash equipment including the batteries and reflector are mounted in housing section 54 and the camera lens, shutter, and film moving mechanism are mounted in section 56.

Figure 12:
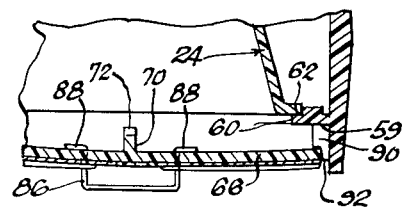
Figure 12 is a sectional view taken on the line 12—12 of Figure 9 and looking in the direction indicated.

Section 54 is provided with a front wall 59, see Figures 9 and 12. This wall has a rectangular opening 60 formed therein, and the edges of the opening are parallel and adjacent to the side surfaces 61 and the top 63 of the housing. Flash bulb reflector 24, described more fully in connection with the embodiment of Figure 1 is mounted in this opening. To properly position this reflector, the edges of opening 60 are provided with a reflector seat 62 which is adapted to engage the outer periphery of the reflector and hold it in a predetermined position in the housing, see Figure 12. The upper edge 64 of the wall 59 is spaced from the inner surface 65 of the top of the housing for reasons to be described below, see Figure 14.

Figure 13:
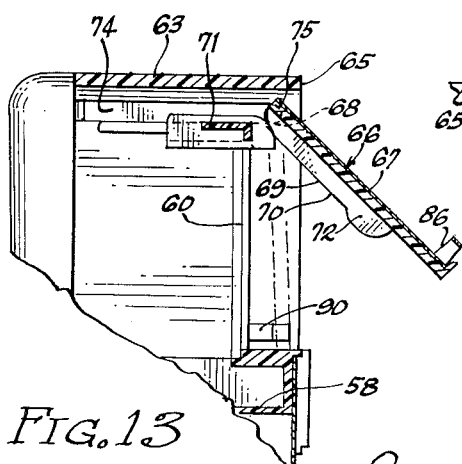
Figure 13 is a sectional view with the reflector omitted, taken on the line 13—13 of Figure 9 and looking in the direction indicated.

A closure 66 slightly bowed in cross section in accordance with the curvature of the top of the housing is movably mounted in the housing for covering the reflector 24, as described in connection with the embodiment shown in Figure 1. The closure is substantially rectangular in shape, and may be formed from any suitable metal or plastic plate or sheet material. In addition, the sides of the closure adjacent its top edge (as seen in Figure 13), are provided with oppositely extending pintles 68. This closure differs from the one in the embodiment shown in Figure 1 in that it is provided with a single rib 70 integrally formed on the inner surface of the closure and substantially perpendicular thereto, see Figure 13. The rib has a uniform thickness throughout, and its inner edge includes a straight guide portion 69 which blends into an arcuate outwardly extending portion 72, which as described below is a part of the closure catch.

Figure 10:
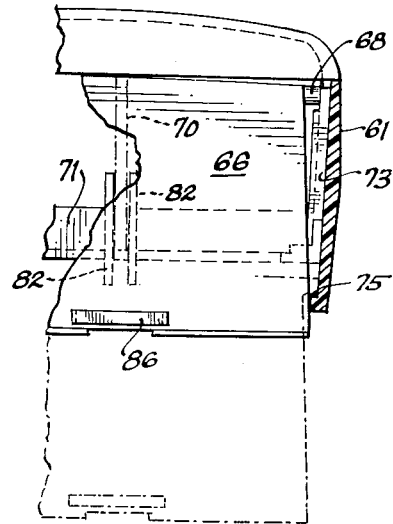
Figure 10 is a sectional view taken on the line 10—10 of Figure 9 and looking in the direction indicated.

As stated above, the upper edge 64 of front wall 59, is spaced from the inner surface 65 of the top of the housing, and this portion of the front wall is provided with a rearwardly extending integrally attached shelf portion 71, see Figures 10 and 13. This shelf portion in combination with the upper portion of the sides of the housing and the top 63 defines a closure receiving opening 74, see Figure 13. The height of this opening is somewhat less than the thickness of the closure taken from the outer surface 67 of the closure to the farthest outwardly extending point on the arcuate portion 72, see Figure 13. The inner surface of the sides of the housing forming this opening are provided with substantially horizontal pintle receiving grooves 73 which extend substantially the width of the sides. As seen in Figure 10, these grooves are closed at their front end 75 and their rear ends are open and are rearwardly diverging for reasons to be described below.

Figure 14:
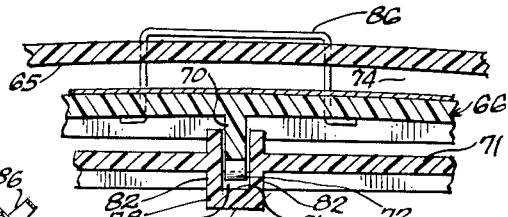
Figure 14 is a sectional view taken on the line 14—14 of Figure 11 and looking in the direction indicated.

Integrally attached to the rearwardly extending shelf portion 71 is an integral horizontal rib receiving guide track 78 positioned at the top of the front wall 59, centrally between the sides, and extending rearwardly and perpendicular thereto, see Figure 14. This guide track is U-shaped in cross section and includes a base or web portion 80 and spaced parallel wall portions 82. A thin comparatively rigid member 84 forming a part of the closure catch extends upwardly from the upper surface 81 of web 80 between walls 82 to a point in the plane of the lower surface of the rearwardly extending planar shelf member 71, see Figure 14. The distance between the inner surface 65 of the top of the housing and the top edge of member 84 is substantially equal to the thickness of the closure from the outer surface 67 to the point 76, for reasons to be described below.

As seen in Figures 10 and 14, the closure is provided with a U-shaped handle 86. The ends of this handle extend through openings in the closure 66 and they are bent over to retain the handle on the closure. The closure is mounted on the housing with the handle 86 removed. To do this the rear wall of the housing is removed exposing the rear of opening 74. Then the closure is positioned horizontally and is passed through opening 74 from the rear of the camera housing towards the front, with pintles 68 riding in grooves 73, and with rib 70 riding in the rib receiving guide track 78. This continues until the pintles reach the closed end 75 of these grooves, whereupon, the closure pivots downward, as shown in Figure 13, and is suspended by the pintles.

The inner surfaces of walls 61 adjacent dividing wall 58 are provided with friction gripping members 90 facing each other on each side of the housing, see Figures 9, 10, and 13. These members comprise tiny bars substantially rectangular in cross section. A portion of these bars is stepped at 92. These stepped portions face each other and the space between them is just a little less than the width of the closure 66.

With the above described arrangement, when flash equipment is not being used, closure 66 is positioned vertically as shown in solid lines in Figure 12, and in dotted lines in Figure 13. In this position the side edges of the closure have been forced into engagement with the stepped portions 92 on the friction gripping members 90. This increases the spacing between these stepped portions, and the resilience of the housing walls exerts a frictional force on the edges of the closure holding it in a closed position.

Figure 11:
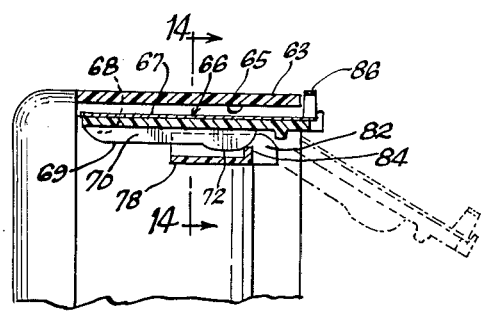
Figure 11 is a sectional view with the reflector omitted, taken on the line 11—11 of Figure 9 and looking in the direction indicated.

When it is desired to use the flash equipment, the closure 66 is first pivoted on pintles 68 into a horizontal position as shown in dotted lines in Figure 11. Then the closure is moved into the closure receiving opening 74 with the rear or top portion of rib 70 moving into the rib receiving guide track 78 and being guided thereby. This continues until the arcuate outwardly extending portion 72 of rib 70 encounters the rigid member 84 extending upward from the base 80 of the guide track. Then the closure 66 is pivoted on this portion, or else it is raised so that the outer surface 67 of the closure slidably rides against the inner surface 65 of the top 63. As stated above, the maximum thickness of the closure is substantially equal to the thickness of the opening 74 at that point, so the closure 66 can be worked past the rigid member 84. When the arcuate portion 72 of rib 70 passes by this member 84, the entire closure can settle slightly and move away from the closure top surface 63 as shown in Figure 14, and the closure will be retained in the housing in opening 74 in an out of the way position, until it is positively removed.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. In a camera having a housing one end portion of which contains the picture taking elements including the lens and shutter in the front wall, a film holder and means for the replacement of film in the housing, said housing embodying in another portion to one side of the picture taking elements a flash assembly comprising an opening in said said front wall, a reflector rectangular in cross section mounted in said front wall opening, the size and shape of the housing selected so the periphery of said reflector is parallel and closely adjacent to the side surfaces and at least one end surface on said housing whereby the camera will be compact and easy to handle, and a closure, said closure movably mounted on said housing so that in one position the closure covers the reflector and protects it from accidental blows and from exposure to the ambient air and in another position the closure uncovers the reflector so it can be used, the top edge of said front wall spaced from the top end of the housing and provided with a planar rearwardly extending horizontal shelf, the upper portions of the walls of the housing, the shelf, and the top of the housing defining a closure receiving opening for protectively receiving said closure so that it may be protected from loss and from accidental damage.

2. The apparatus set forth in claim 1 wherein said closure is substantially rectangular and is provided with oppositely extending pintles on its sides and a perpendicular rearwardly extending outwardly projecting rib centrally disposed between its sides on its inner surface, the side surfaces of said closure receiving opening provided with pintle receiving grooves closed at the front of the housing, said shelf provided with an integrally formed rearwardly extending horizontal rib receiving guide groove, said closure mounted in said housing so that in one position the closure will be pivotally suspended from pintles at the closed end of the pintle receiving grooves to protectively cover said reflector and in another position the closure is pivoted on said pintles into a horizontal position and is moved into said closure receiving opening with said pintles riding in said pintle receiving grooves and said rib riding in said rib receiving guide groove so that the closure is protectively received in said housing while the rectangular reflector is being used.

3. The apparatus set forth in claim 2 including means for retaining said closure in said closure receiving opening until it is positively removed.

4. The apparatus set forth in claim 2 including a friction clasp integrally formed on the opposed sides of the housing for engaging the opposed edges of said closure when the reflector is in said one position and frictionally holding it in that position.

5. In a camera having a housing containing in one end portion the picture taking elements including the lens, shutter, film holder and means for replacement of the film in the housing, said housing embodying in an integral portion to one side of the picture taking elements a flash assembly comprising an opening extending inwardly from the wall of the camera housing in which the lens and shutter of the picture taking elements are located, a reflector set into the opening with the reflector surface facing the opening in the same direction as the lens and shutter, and a closure movably mounted in the housing for shifting movement between open position with the closure received within said opening to expose the reflector and closed position with the closure extending across the opening in advance of the reflector to conceal the opening and to protect the reflector, said reflector being rectangular in cross-section, the size and shape of the housing being selected so that the periphery of the reflector is parallel and closely adjacent to the side surfaces thereof and at least one end surface, said closure being substantially rectangular and provided with oppositely extending pintles on its sides, the side surfaces of said opening being provided with pintle receiving grooves so that in one position the closure will be pivotally suspended from the pintles at one end of said grooves protectively to cover the reflector and in another position with said pintles in a horizontal position and movable into said opening with said pintles riding in said guideways whereby the closure in said other position is protectively received in said housing while the rectangular reflector is being used.

6. The apparatus set forth in claim 5 wherein said reflector has the shape of a frustum of a quadrangular pyramid.

References Cited in the file of this patent

UNITED STATES PATENTS

| | | |
|---|---|---|
| D. 115,313 | Helzick | June 20, 1939 |
| 776,195 | McClure | Nov. 29, 1904 |
| 1,342,083 | Arnold | June 1, 1920 |
| 1,729,401 | Richards | Sept 24, 1929 |
| 2,290,793 | Alderman | July 21, 1942 |
| 2,737,095 | Simjian | Mar. 6, 1956 |
| 2,783,696 | Sewig | Mar. 5, 1957 |